(12) United States Patent
Caceres

(10) Patent No.: US 8,424,104 B2
(45) Date of Patent: Apr. 16, 2013

(54) MOBILE ACCESS TO DIGITAL MEDIA

(75) Inventor: Barry M. Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 12/827,282

(22) Filed: Jun. 30, 2010

(65) Prior Publication Data

US 2012/0005761 A1    Jan. 5, 2012

(51) Int. Cl.
*H04L 29/06*    (2006.01)

(52) U.S. Cl.
USPC .............................................. 726/28; 726/26

(58) Field of Classification Search .............. 726/26, 726/27, 28, 29; 713/182; 380/231; 725/29, 725/74, 76, 77, 78, 86; 705/52
See application file for complete search history.

(56) References Cited

U.S. PATENT DOCUMENTS

| | | | |
|---|---|---|---|
| 5,990,885 A * | 11/1999 | Gopinath | 715/716 |
| 7,395,339 B2 | 7/2008 | Kirkland | |
| 2003/0084451 A1* | 5/2003 | Pierzga et al. | 725/47 |
| 2004/0117665 A1* | 6/2004 | Ong | 713/202 |
| 2004/0249663 A1 | 12/2004 | Shishido | |
| 2005/0033850 A1* | 2/2005 | Kirkland | 709/228 |
| 2007/0261095 A1 | 11/2007 | Petrisor et al. | |
| 2009/0138920 A1* | 5/2009 | Anandpura | 725/76 |

FOREIGN PATENT DOCUMENTS

EP    2009919 A1    12/2008

* cited by examiner

*Primary Examiner* — Edward Zee
(74) *Attorney, Agent, or Firm* — Law Office of Jim Boice

(57) ABSTRACT

A computer implemented method provides a specific traveler with mobile access to a digital media library. A plurality of registration stations, which are utilized in a travel and lodging industry to acknowledge arrivals and departures of travelers, are monitored. In response to detecting a specific traveler checking in at a pre-determined registration station from the plurality of registration stations, contents of a pre-defined digital media library are transmitted to a digital media player for use by the specific traveler.

15 Claims, 3 Drawing Sheets

MOBILE ACCESS TO DIGITAL MEDIA

BACKGROUND

The present disclosure relates to the field of computers, and specifically to the use of digital media with computers. Still more particularly, the present disclosure relates to mobile access of digital media that is used by computers.

BRIEF SUMMARY

In one embodiment of the present disclosure, a computer implemented method provides a specific traveler with mobile access to a digital media library. A plurality of registration stations, which are utilized to acknowledge arrivals and departures of travelers, are monitored. In response to detecting a specific traveler checking in at a pre-determined registration station from the plurality of registration stations, contents of a pre-defined digital media library is transmitted to a digital media player for use by the specific traveler.

In one embodiment, a computer system comprises: a central processing unit; and a memory coupled to the central processing unit, wherein the memory comprises software that, when executed, causes the central processing unit to implement: monitoring a plurality of registration stations, wherein the registration stations are utilized to acknowledge arrivals and departures of travelers; and in response to detecting a specific traveler checking in at a pre-determined registration station from the plurality of registration stations, transmitting contents of a pre-defined digital media library to a digital media player for use by the specific traveler.

In one embodiment, a computer program product comprises: a computer readable storage medium having computer readable program code embodied therewith, the computer readable program code comprising: computer readable program code to monitor a plurality of registration stations, wherein the registration stations are utilized to acknowledge arrivals and departures of travelers; and computer readable program code to, in response to detecting a specific traveler checking in to a pre-determined registration station from the plurality of registration stations, transmitting contents of a pre-defined digital media library to a digital media player for use by the specific traveler.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
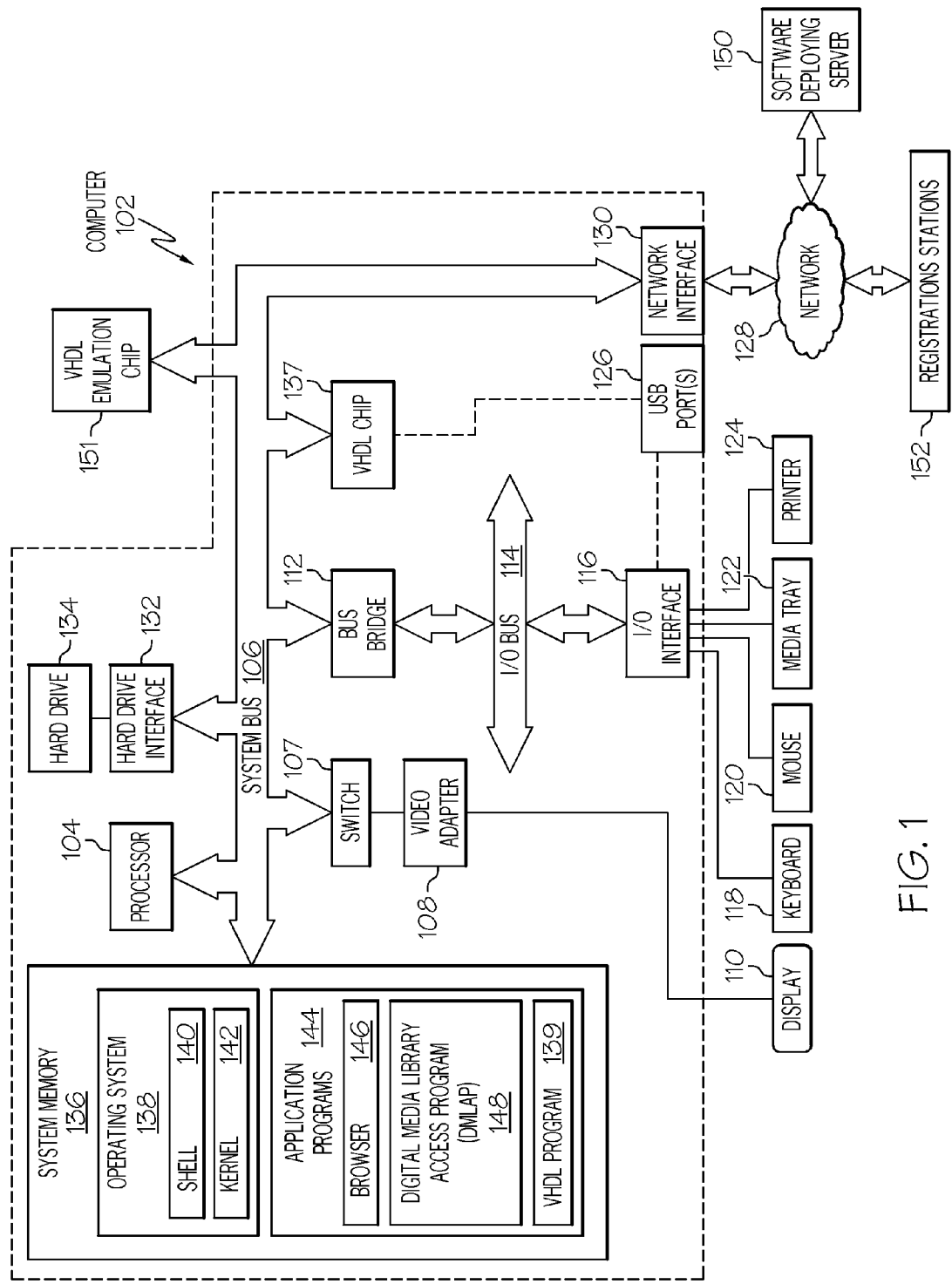
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, and/or registration stations 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., digital media library access program—DMLAP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or registration stations 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a digital media library access program (DMLAP) 148. DMLAP 148 includes code for implementing the processes described below, including those described in FIGS. 2-3. In one embodiment, computer 102 is able to download DMLAP 148 from software deploying server 150, including in an on-demand basis, such that the code from DMLAP 148 is not downloaded until runtime or otherwise immediately needed by computer 102. Note further that, in one embodiment of the present disclosure, software deploying server 150 performs all of the functions associated with the present disclosure (including execution of DMLAP 148), thus freeing computer 102 from having to use its own internal computing resources to execute DMLAP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from DMLAP 148 causes VHDL program 139 to configure VHDL chip 137, which may be an FPGA, ASIC, etc.

In another embodiment of the present disclosure, execution of instructions from DMLAP 148 results in a utilization of VHDL program 139 to program a VHDL emulation chip 151. VHDL emulation chip 151 may incorporate a similar architecture as described above for VHDL chip 137. Once DMLAP 148 and VHDL program 139 program VHDL emulation chip 151, VHDL emulation chip 151 performs, as hardware, some or all functions described by one or more executions of some or all of the instructions found in DMLAP 148. That is, the VHDL emulation chip 151 is a hardware emulation of some or all of the software instructions found in DMLAP 148. In one embodiment, VHDL emulation chip 151 is a programmable read only memory (PROM) that, once burned in accordance with instructions from DMLAP 148 and VHDL program 139, is permanently transformed into a new circuitry that performs the functions needed to perform the process described below in FIGS. 2-3.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
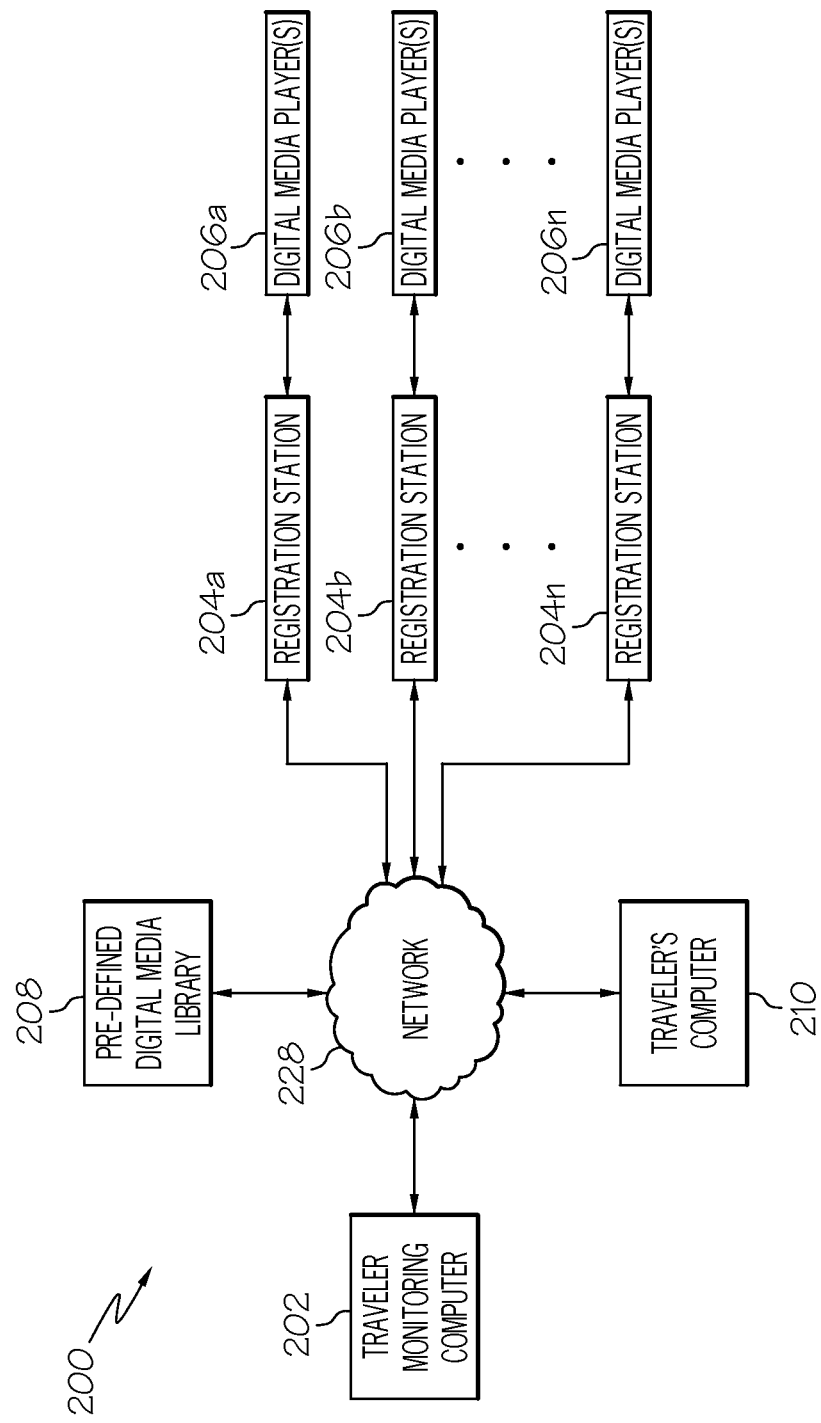
FIG. 2 illustrates an exemplary networked system in which a traveler monitoring computer monitors a plurality of registration stations in the travel and lodging industry.

With reference now to FIG. 2, an exemplary networked system 200 in which a traveler monitoring computer 202 monitors a plurality of registration stations 204*a-n* (where "n" is an integer) in the travel and lodging industry is presented. Traveler monitoring computer 202 (analogous to computer 102 shown in FIG. 1) is coupled, via a network 228, to multiple registration stations 204*a-n* (analogous to registration stations 152 shown in FIG. 1). In accordance with the disclosure presented herein, each of the registration stations 204*a-n* controls what digital media can be supplied to a corresponding one or more digital media players 206*a-n*. For example, assume that registration station 204*a* is at an airline counter. Thus, registration counter 204*a* may be known colloquially as the "check-in counter" or the "airline counter". When a traveler checks in at registration counter 204*a* for a specific flight, access authorization is then presented by registration counter 204 to download/stream the contents of a pre-defined digital media library 208 to a corresponding one or more digital media players 206*a* on the airplane. In one embodiment, this downloading/streaming is only to a media player (e.g., a video screen, audio headphones, etc.) associated with a particular seat to which that traveler is assigned. In one embodiment, access to the pre-defined digital media library 208 is limited to that particular seat while that traveler is actually on the plane. As described further in FIG. 3, if the flight is delayed, then delivery of the contents of the pre-defined digital media library 208 is delayed and/or suspended until the flight actually departs.

In one embodiment, the contents of the pre-defined digital media library 208 are selectively available to a group on a flight. That is, assume that a specific traveler is traveling with a group, such as his family. The specific traveler can preselect, either manually or by providing the traveler monitoring computer 202 with parameter guidelines such as content ratings, etc., which member of his family (and thus which specific seat on the aircraft) receives particular content from the pre-defined digital media library 208. Thus, the specific traveler may have access to all of the content of the pre-defined digital media library 208, while her small children are allowed to watch in flight only "G" rated content from the pre-defined digital media library 208.

In one embodiment, assume that registration station 204b is at a registration desk at a lodging facility, such as a hotel. In this exemplary embodiment, the associated digital media player(s) 206b may be a television, a music system, etc. Access to the pre-defined digital media library 208 in this example may be limited to the specific room that is registered to (and/or occupied by) the specific traveler for the duration of his stay (e.g., until he "checks out" of the hotel at registration station 204b). Note that if the room in the hotel has multiple televisions, or if the specific traveler has registered in multiple rooms (e.g., with her children occupying another room from hers), then the specific traveler can adjust which television receives which content, as described above with reference to seats on an aircraft.

In one embodiment, the pre-defined digital media library 208 is a collection of audio files (e.g., music, audio books, etc.) that belongs to the specific traveler (e.g., are on his home computer, etc.). In one embodiment, the pre-defined media library 208 is a collection of video files (e.g., movies, either commercially produced by another or "home movies" created by the specific traveler) that belongs to the specific traveler. In one embodiment, access is limited to only digital media files in the pre-defined digital media library 208 for which the specific traveler holds copyrights (e.g., home videos, home audio recordings, etc. that were created by the specific traveler).

In one embodiment, the act of the specific traveler checking in and checking out at a pre-determined registration station (from registration stations 204a-n) defines an authorization time period. This authorization time is then used to limit the streaming (and/or downloading) of contents of the pre-defined digital media library 208 to the specific traveler (in real-time if streaming) only during the authorization time period.

Figure 3:
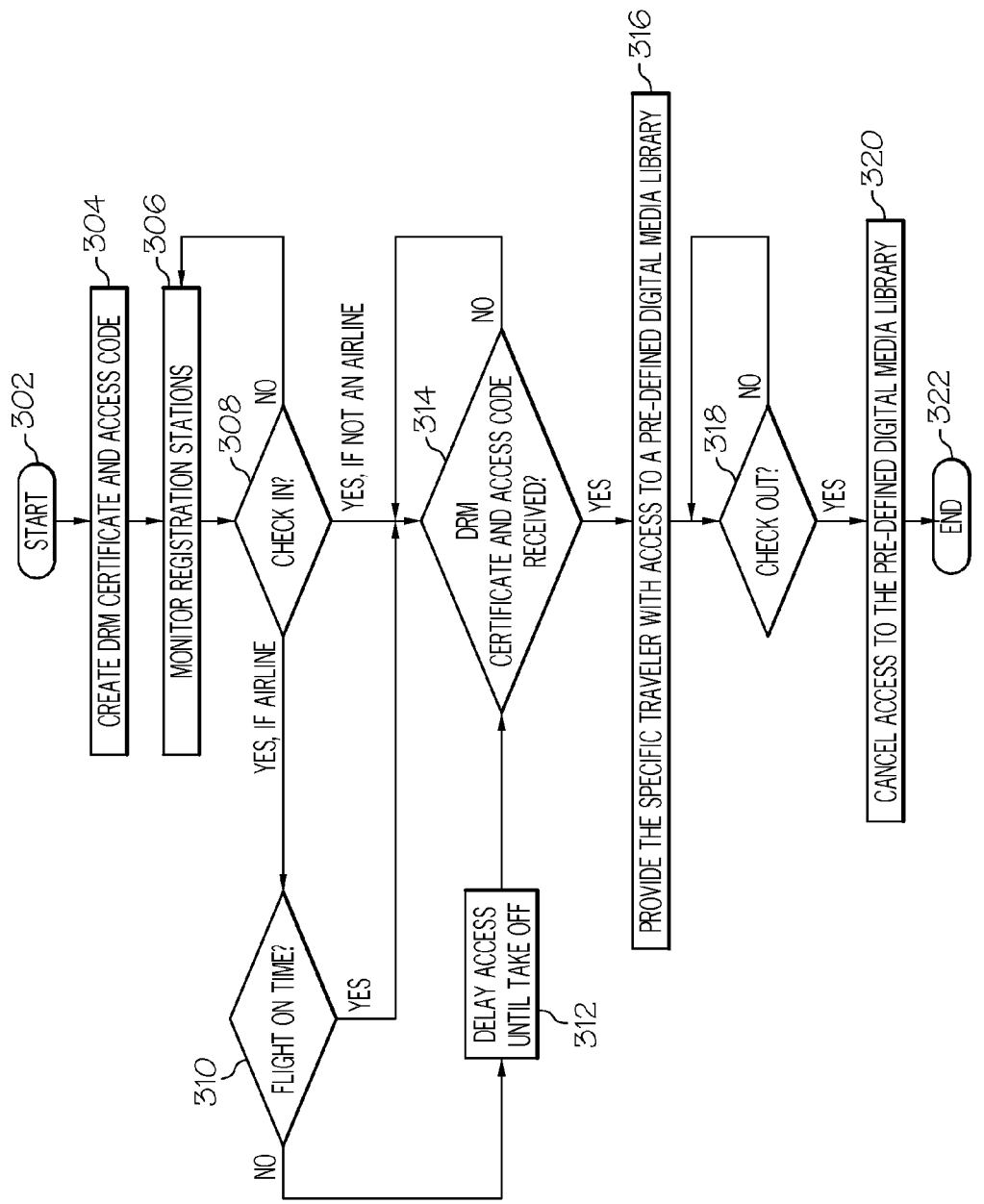
FIG. 3 is a high level flow chart of one or more exemplary steps taken by a computer to provide a specific traveler with mobile access to a digital media library.

With reference now to FIG. 3, a high level flow chart of one or more exemplary steps taken by a computer to provide a specific traveler with access to a digital media library is presented. After initiator block 302, a transient digital rights management (DRM) certificate for the specific traveler and an access code for the DRM certificate are created (block 304). In one embodiment, the DRM certificate and the access code for the DRM certificate are both created the traveler monitoring computer 202, shown in FIG. 2, which knows the travel itinerary of the specific traveler. In one embodiment, the DRM certificate and the access code are then presented to the specific traveler prior to his trip. The DRM certificate, which is presented to the pre-defined digital media library 208 shown in FIG. 2 in response to the traveler monitoring computer 202 receiving the access code from a traveler's computer 210 shown in FIG. 2, allows the specific traveler, and more specifically the appropriate digital media player from digital media players 206a-n, to access the pre-defined digital media library. In one embodiment, the DRM certificate is a transient DRM certificate that is only valid for as long as the specific traveler is at a particular hotel, on a particular flight, etc. In such an embodiment, the transient DRM certificate is issued to the specific traveler and/or registration station and/or digital media player only upon the traveling monitoring computer receiving the access code from the specific traveler. If the access code is received, then the traveling monitoring computer sends the transient DRM certificate to the pre-defined digital media library, giving the specific traveler (and the appropriate media player) transient access (e.g., while in the hotel, while on the flight, etc.) to the pre-defined digital media library.

Returning to FIG. 3, the various registration stations are then monitored to determine if the specific traveler has checked in (block 306). As described herein, these registration stations are utilized in a travel and lodging industry to acknowledge arrivals and departures of travelers. A query is thus initially made to determine if the specific traveler has checked in at one of the registration stations (query block 308). In one embodiment, assume that the registration station is a check-in counter for an airline. As described in query block 310, query can then be made as to whether the flight is leaving on time (i.e., a real-time flight status of a flight on which the specific traveler is seeking access to the pre-defined digital media library is monitored). If the flight is delayed for takeoff, then access to the pre-defined digital media library is suspended (delayed) until the flight actually departs (block 312).

With reference now to query block 314, a check can be made to ascertain whether or not the DRM certificate and/or the access code to release the DRM certificate have been received respectively by the pre-defined digital media library and by the traveler monitoring computer. If so, and assuming that the specific traveler has checked in to the requisite registration station (query block 308), then the specific traveler is provided with access to the pre-defined digital media library (block 316) More specifically, contents of the pre-defined digital media library are then transmitted to a digital media player for use by the specific traveler.

Note that in one embodiment, reservation information about the specific traveler is irrelevant to the present disclosure, and thus is not examined. That is, the specific traveler may have made a reservation to be on a particular flight, to stay in a particular hotel, etc. However, the media content is not transmitted to that flight, hotel, etc. until the specific traveler actually checks in. This embodiment avoids issues associated with late flights, no-shows, etc., which could result in the media content being available to unauthorized persons. That is, if the specific traveler fails to show up at a hotel where he has made a reservation, the media content that is provided based on reservation information for a specific room would result in an alternate guest taking the room, and thus being able to view the media content that belongs to the other traveler. This embodiment also avoids taking up bandwidth to transmit the media content if it is ultimately unused, due to a change in travel plans, etc.

With reference to query block 318, the registration station at which the specific traveler checked in is then monitored to determine if the specific traveler has checked out (e.g., checked out of a hotel, his flight has landed, etc.) If so, then access, for that specific traveler, to the pre-defined digital media library is cancelled (block 320) until the specific traveler checks in at the same or another registration station (query block 308). The process ends at terminator block 322.

Note that in one embodiment of the present disclosure,

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method to provide a specific traveler with mobile access to a digital media library, the computer implemented method comprising:
   monitoring, by a processor, a plurality of registration stations, wherein the plurality of registration stations are utilized to acknowledge arrivals and departures of travelers;
   creating a transient digital rights management (DRM) certificate for the specific traveler;
   creating an access code for the transient DRM certificate;
   in response to detecting the specific traveler checking in at a pre-determined registration station from the plurality of registration stations and in response to a travel monitoring computer receiving the access code from the specific traveler, issuing the transient DRM certificate to the specific traveler, the pre-determined registration station and a digital media player, wherein the transient DRM certificate is only valid for as long as the specific traveler is on a particular flight in order to grant the specific traveler access to a pre-defined digital media library; and
   in response to detecting the specific traveler checking in at the pre-determined registration station from the plurality of registration stations, transmitting contents of the pre-defined digital media library to the digital media player for use by the specific traveler.

2. The computer implemented method of claim 1, further comprising:
   in response to detecting the specific traveler checking out at the pre-determined registration station, cancelling access to the pre-defined digital media library.

3. The computer implemented method of claim 1, wherein the specific traveler checking in and checking out at the pre-determined registration station defines an authorization time period, and wherein the computer implemented method further comprises:
   streaming contents of the pre-defined digital media library to the specific traveler in real-time only during the authorization time period.

4. The computer implemented method of claim 1, wherein the pre-determined registration station is an airline counter, and wherein the computer implemented method further comprises:
   monitoring a real-time flight status of a flight on which the specific traveler is seeking access to the pre-defined digital media library; and
   in response to detecting a delay for the flight, suspending access to the pre-defined digital media library until the flight actually departs.

5. The computer implemented method of claim 1, wherein the pre-determined registration station is an airline counter, and wherein the computer implemented method further comprises:
   detecting a specific seat that is to be occupied by the specific traveler on a flight; and
   limiting access to the pre-defined digital media library to the specific seat and while the specific traveler is on the flight.

6. The computer implemented method of claim 1, wherein the pre-determined registration station is an airline counter, and wherein the computer implemented method further comprises:
   detecting a group of multiple seats that are to be occupied by the specific traveler and companions of the specific traveler on a flight;
   limiting access to the pre-defined digital media library to the group of multiple seats and while the specific traveler is on the flight; and
   providing different content, from the pre-defined digital media library, to different seats occupied by the companions of the specific traveler in accordance with pre-defined content rating parameters received from the specific traveler.

7. The computer implemented method of claim 1, wherein the pre-defined digital media library is a collection of audio files that belongs to the specific traveler.

8. The computer implemented method of claim 1, wherein the pre-defined digital media library is a collection of video files that belongs to the specific traveler.

9. The computer implemented method of claim 1, further comprising:

limiting access to the pre-defined digital media library to digital media files in the pre-defined digital media library for which the specific traveler holds copyrights.

10. A computer system comprising:
a central processing unit; and
a memory coupled to the central processing unit, wherein the memory comprises software that, when executed, causes the central processing unit to implement:
monitoring a plurality of registration stations, wherein the plurality of registration stations are utilized to acknowledge arrivals and departures of travelers;
creating a transient digital rights management (DRM) certificate for a specific traveler;
creating an access code for the transient DRM certificate;
in response to detecting the specific traveler checking in at a pre-determined registration station from the plurality or registration stations and in response to a travel monitoring computer receiving the access code from the specific traveler, issuing the transient DRM certificate to the specific traveler, the pre-determined registration station and a digital media player, wherein the transient DRM certificate is only valid for as long as the specific traveler is on a particular flight in order to grant the specific traveler access to a pre-defined digital media library; and
in response to detecting the specific traveler checking in at the pre-determined registration station from the plurality of registration stations, transmitting contents of the pre-defined digital media library to the digital media player for use by the specific traveler.

11. The computer system of claim 10, wherein the pre-determined registration station is at an airline counter, and wherein the software, when executed, further causes the central processing unit to implement:
monitoring a real-time flight status of a flight on which the specific traveler is seeking access to the pre-defined digital media library; and
in response to detecting a delay for the flight, suspending access to the pre-defined digital media library until the flight actually departs.

12. A computer program product comprising:
a computer readable storage medium having computer readable program code embodied therewith, the computer readable program code comprising:
computer readable program code executable by a processor to monitor a plurality of registration stations, wherein the plurality of registration stations are utilized to acknowledge arrivals and departures of travelers;
computer readable program code executable by a processor to create a transient digital rights management (DRM) certificate for a specific traveler;
computer readable program code executable by a processor to create an access code for the transient DRM certificate;
computer readable program code executable by a processor to, in response to detecting the specific traveler checking in at a pre-determined registration station from the plurality of registration stations and in response to a travel monitoring computer receiving the access code from the specific traveler, issue the transient DRM certificate to the specific traveler, the pre-determined registration station and a digital media player, wherein the transient DRM certificate is only valid for as long as the specific traveler is on a particular flight in order to grant the specific traveler access to a pre-defined digital media library; and
computer readable program code executable by a processor to, in response to detecting the specific traveler checking in to the pre-determined registration station from the plurality of registration stations, transmit contents of the pre-defined digital media library to the digital media player for use by the specific traveler.

13. The computer program product of claim 12, wherein the computer readable program code further comprises:
computer readable program code executable by a processor to, in response to detecting the specific traveler checking out from the pre-determined registration station, cancel access to the pre-defined digital media library.

14. The computer program product of claim 12, wherein the specific traveler checking in and checking out at the pre-determined registration station defines an authorization time period, and wherein the computer readable program code further comprises:
computer readable program code executable by a processor to stream the pre-defined digital media to the specific traveler in real-time only during the authorization time period.

15. The computer program product of claim 12, wherein the pre-determined registration station is an airline counter, and wherein the computer readable program code further comprises:
computer readable program code executable by a processor to monitor a real-time flight status of a flight on which the specific traveler is seeking access to the pre-defined digital media library; and
computer readable program code executable by a processor to, in response to detecting a delay for the flight, suspend access to the pre-defined digital media library until the flight actually departs.

* * * * *